Patented Mar. 28, 1944

2,345,111

UNITED STATES PATENT OFFICE 2,345,111

PROCESS OF PRODUCING HIGHER POLYENALS

Christoph Grundmann, Dessau, Germany; vested in the Alien Property Custodian

No Drawing. Application October 17, 1940, Serial No. 361,592. In Germany October 20, 1939

4 Claims. (Cl. 260—601)

The invention relates to a process for producing higher molecular polyenealdehydes from acetaldehyde.

It is known that crotonaldehyde and its vinylene homologues as hexadienal, octatrienal, decatetraenal, dodecapentaenal may be condensed in the presence of secondary organic bases or their salts with organic acids respectively to straight chained polyenealdehydes (polyenals). However according to the literature these condensation products are obtained in a comparatively small and varying yield. As chief products of the reaction cyclic bodies are formed. The explanation of the mechanism of this condensation has shown, that the intermediate product of this reaction is 1-dialkyl-aminobutadiene of the formula

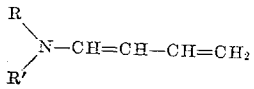

which as diene is easily added to dienophile compounds while forming derivatives of the dihydrobenzol. Under the conditions of the condensation hitherto applied, i. e., by working with non-diluted crotonaldehyde in the presence of little amounts of a catalyst this reaction is greatly promoted, as it is most probable that the reactive intermediate product is caught by the dienophile components, e. g., crotonaldehyde present in a considerable excess.

Now it has been found that higher linear polyenals and especially polyenals with no less than 12 carbon atoms are obtained in a very satisfactory yield when proceeding at the condensation from the acetaldehyde and when keeping the reaction temperature advantageously near to the boiling point of the acetaldehyde. So in the midst of the acetaldehyde the developing intermediate products will have a reduced possibility of entering into dienesyntheses and therefore the linear condensation will be preferred. The polyenals may be converted in a usual way into carboxylic acids of an equal or higher molecular weight, into aldehydes with a higher percentage of hydrogen as well as into the corresponding primary alcohols, which may serve for well known technical purposes. The thus obtained mixtures represent either as such or in the form of their fractions, a valuable substitute for fatty acids, fatty aldehydes and fatty alcohols.

Example 156 parts by weight of acetaldehyde (93 to 100%) are mixed with 4 parts by weight of piperidine and with acetic acid of the amount required for neutralisation and kept by cooling at 15 to 20° C. After the heat effect is disappeared the equal amount of the catalyst is added and this operation is repeated once more while increasing the temperature to 25° C. After a 16 hours' standing at 15 to 20° C. a thick dark-red mass of a mixture of crystallised polyenals is obtained which is purified by washing with methanol. The obtained polyenals are very difficultly soluble in the usual solvents. They may be converted by hydrogenation in a known manner into saturated aldehydes or saturated alcohols respectively.

Instead of the piperidine acetate as catalysts other salts of secondary organic bases may be used such as piperidine formiate, piperidine butyrate, piperidine crotonate, piperidine chloroacetate, piperazine mono- or diacetate, morpholine acetate, diethylamine acetate, dibutylamine acetate and the like. The amount of the catalysts may vary between 1–10 percent related to the acetaldehyde. The reaction temperatures in general are below 100° preferably near the boiling point of the acetaldehyde of 21°. Furthermore the condensation process may be carried out under pressure or in the presence of organic solvents as diethylether, dibutylether, dioxane and the like.

I claim:

1. A process for producing higher molecular polyenals which comprises condensing acetaldehyde in the presence of a catalyst consisting of 1 to 10%, as compared to the acetaldehyde, of a secondary amine salt of a weak organic acid, at a temperature near the boiling point of acetaldehyde, said secondary amine being selected from the group consisting of secondary aliphatic amines and secondary amines containing a saturated heterocyclic ring.

2. A process for producing higher molecular polyenals of at least 12 carbon atoms which comprises condensing acetaldehyde in the presence of a catalyst consisting of 1 to 10%, as compared to the acetaldehyde, of a secondary amine salt of a lower molecular aliphatic carboxylic acid at a temperature near the boiling point of acetaldehyde, said secondary amine being selected from the group consisting of secondary aliphatic amines and secondary amines containing a saturated heterocyclic ring.

3. A process for producing higher molecular polyenals which comprises condensing acetaldehyde in the presence of a catalyst consisting of 1 to 10%, as compared to the acetaldehyde, of a piperidine salt of acetic acid at a temperature near the boiling point of acetaldehyde.

4. A process for producing higher molecular polyenals of at least 12 carbon atoms which comprises condensing acetaldehyde in the presence of a catalyst consisting of 1 to 10%, as compared to the acetaldehyde, of a piperidine salt of a lower molecular aliphatic carboxylic acid at a temperature near the boiling point of acetaldehyde.

CHRISTOPH GRUNDMANN.